United States Patent [19]

Fujioka

[11] Patent Number: 5,619,529
[45] Date of Patent: Apr. 8, 1997

[54] NON-CONTACT IC CARD AND NON-CONTACT IC CARD READER/WRITER

[75] Inventor: Shuzo Fujioka, Itami, Japan

[73] Assignee: Mitsubishi Denki Kabushiki Kaisha, Tokyo, Japan

[21] Appl. No.: 500,640

[22] Filed: Jul. 11, 1995

Related U.S. Application Data

[63] Continuation of Ser. No. 92,985, Jul. 19, 1993, abandoned.

[30] Foreign Application Priority Data

Jul. 20, 1992 [JP] Japan .................................. 4-192093

[51] Int. Cl.$^6$ ................................ H04L 5/16; H04B 1/38
[52] U.S. Cl. ...................... 375/219; 340/825.31; 455/73; 235/380
[58] Field of Search ..................................... 375/219, 220, 375/222, 238, 297, 345; 455/73, 127, 69; 235/492, 493, 380, 437; 364/480; 340/825.31, 825.33, 825.34, 825.3, 386, 318, 319; 379/144; 370/8, 9

[56] References Cited

U.S. PATENT DOCUMENTS

| | | | |
|---|---|---|---|
| 3,707,711 | 12/1972 | Cole et al. | 340/280 |
| 4,570,127 | 2/1986 | Tanimoto et al. | 330/137 |
| 5,068,521 | 11/1991 | Yamaguchi | 235/492 |
| 5,202,838 | 4/1993 | Inoue | 364/480 |
| 5,212,373 | 5/1993 | Fujioka et al. | 235/492 |
| 5,220,158 | 6/1993 | Takahira et al. | 235/492 X |

FOREIGN PATENT DOCUMENTS

| | | |
|---|---|---|
| 2116808 | 9/1983 | United Kingdom . |
| 2239374 | 6/1991 | United Kingdom . |
| 2242043 | 9/1991 | United Kingdom . |

OTHER PUBLICATIONS

"Non-Contact Type IC Card For Data Communication with Light", Nikkei Electronics, Mar. 10, 1988, No. 457, pp. 197-202.

"Techniques and Applications of Data Carriers", Nikkan Kyogo Shinbunsha, Oct. 20, 1990, pp. 14-23.

*Primary Examiner*—Stephen Chin
*Assistant Examiner*—Bryan Webster
*Attorney, Agent, or Firm*—Leydig, Voit & Mayer

[57] ABSTRACT

A non-contact IC card or a non-contact IC card reader/writer has an antenna for receiving a signal transmitted from the reader/writer or the IC card, a receiver circuit for demodulating the signal received by the receiving antenna and for converting the demodulated signal into a received data signal, a control circuit for data processing in response to the received data signal, a transmitter circuit for forming a transmission signal in response to a data signal supplied by the control circuit and for setting the transmission width of the transmission signal corresponding to one data bit to a value smaller than the signal width of one data bit, and a transmitting antenna for transmitting the transmission signal from the transmitter circuit to the reader/writer or the IC card. According to a data transmission method of the invention, a data row having a first data item as dummy data is transmitted from the non-contact IC card to the reader/writer and the amplification of the received signal in the reader/writer is controlled so that the intensity of the received dummy data is equal to a predetermined value.

3 Claims, 12 Drawing Sheets

NON-CONTACT IC CARD AND NON-CONTACT IC CARD READER/WRITER

This disclosure is a continuation of patent application Ser. No. 08/092,985, filed Jul. 19, 1993 now abandoned.

BACKGROUND OF THE INVENTION

1. Field of the Invention

This invention relates to a non-contact IC card and a non-contact IC card reader/writer arranged to transmit data through electromagnetic waves or the like. This invention also relates to a method of transmitting data in a non-contact manner.

2. Description of the Related Art

FIG. 10 shows a conventional data transmission system using a non-contact IC card 2. A non-contact IC card reader/writer 1 is connected to an external unit 3, and the non-contact card 2 is positioned in the vicinity of the reader/writer 1. The external unit 3 sends to the reader/writer 1 commands relating to signal transmission and receives results of communication with the IC card 2 and other signals. The reader/writer 1 has a transmitting antenna 11 for transmitting electromagnetic waves and a receiving antenna 13 for receiving electromagnetic waves. A transmitter circuit 12 is connected to the transmitting antenna 11 while a receiver circuit 14 is connected to the receiving antenna 13. A (universal asynchronous receiver transmitter) UART 15 is connected to the transmitter circuit 12 and the receiver circuit 14, and a control circuit 16 is connected to the UART 15. The control circuit 16 is connected to the external circuit 3 through an input/output circuit 17.

On the other hand, the IC card 2 has a transmitting antenna 21 and a receiving antenna 23 as in the case of the reader/writer 1. A transmitter circuit 22 is connected to the transmitting antenna 21 while a receiver circuit 24 is connected to the receiving antenna 23. A UART 25 is connected to the transmitter circuit 22 and the receiver circuit 24, and a control circuit 26 is connected to the UART 25.

The reader/writer 1 receives data from the IC card 2 as described below. Electromagnetic waves transmitted from the transmitting antenna 21 of the IC card 2 are received by the receiving antenna 13 of the reader/writer 1, and a received signal S1 is supplied to the receiver circuit 14. FIG. 11 shows blocks of the receiver circuit 14. The received signal S1 is amplified by a high-frequency amplifier circuit 141 in the receiver circuit 14, demodulated by a detector circuit 142, and amplified by a low-frequency amplifier circuit 143 as serial data S2 which is sent to the UART 15. Serial data S2 is converted into parallel data S3 by the UART 15, and parallel data S3 is supplied to the control circuit 16. The control circuit 16 reads the content of parallel data S3 and performs required processing.

The reader/writer 1 transmits data to the IC card 2 as described below. Parallel data S3 is supplied from the control circuit 16 to the UART 15 and converted into serial data S4 by the UART 15. The converted data is sent to the transmitter circuit 12. FIG. 12 shows blocks of the transmitter circuit 12. A clock signal generated by an oscillator 124 is converted into a carrier clock signal S5 having a carrier frequency by a frequency divider 123 or a multiplier. The carrier clock signal S5 supplied from the frequency divider 123 is modulated in a modulator circuit 122 with serial data S4 from the UART 15. The modulated signal is amplified by a power amplifier circuit 121 and is thereafter sent to the transmitting antenna 11 as a transmitted signal S6.

A modulation method using amplitude shift key (ASK) modulation is ordinarily used for the above-described data transmission/reception. In the ASK modulation, "0" and "1" of data are represented by the existence and non-existence of electromagnetic waves W1, as shown in FIG. 13. Actually, however, induced electrical currents do not attenuate instantly when data is changed from "0" to "1", because of occurrence of free vibration in the transmitting antenna 11. For example, transmitted electric waves W2 ring for a time period T1 in the transmitting antenna 11 after data has been changed from "0" to "1". Ringing also occurs when electromagnetic waves are received. Even if ideal electromagnetic waves W1 shown in FIG. 13 are received, received waveform W3 exists through a time period T2 after electric waves W1 have ceased to exist, because ringing occurs in the receiving antenna 13. Ringing also occurs in the IC card 2 as well as in the reader/writer 1.

Generally, ringing continues through a longer time if electromagnetic waves are stronger, and attenuates in a shorter time if electromagnetic waves are weaker. In the conventional transmission system, the intensity of electromagnetic waves output from each of the reader/writer 1 and the IC card 2 is constant and the intensity of electromagnetic waves received by the reader/writer 1 or the IC card 2 changes depending upon the distance between the reader/writer 1 and the IC card 2. With the change in the intensity of electromagnetic waves, the period of time through which the received waveform exists is changed. That is, if the IC card 2 is placed close to the reader/writer 1, each of the IC card 2 and the reader/writer 1 receives stronger electromagnetic waves, and ringing occurs for a longer time in the receiving antenna 23 of the IC card 2 or the receiving antenna 13 of the reader/writer 1. Thus, it is difficult to normally modulate or demodulate signals and there is a possibility of failure to accurately transmit data

SUMMARY OF THE INVENTION

In view of these problems, an object of the present invention is to provide a non-contact IC card and a non-contact IC card reader/writer capable of accurately transmitting data.

Another object of the present invention is to provide a data transmission method which ensures accurate data transmission.

To achieve these objects, according to one aspect of the present invention, there is provided a non-contact IC card comprising receiving antenna means for receiving a signal transmitted from a reader/writer, a receiver circuit for demodulating the signal received by the receiving antenna means and for converting the demodulated signal into a received data signal, a control circuit for data processing on the basis of the received data signal converted by the receiver circuit, a transmitter circuit for forming a transmitted signal on the basis of a transmitted data signal supplied from the control circuit and for setting the transmission width of the transmitted signal corresponding to one data bit to a value smaller than the signal width of one data bit, and transmitting antenna means for transmitting the transmitted signal from the transmitter circuit to the reader/writer.

According to another aspect of the present invention, there is provided a non-contact IC card comprising receiving antenna means for receiving a signal transmitted from a reader/writer, a receiver circuit for demodulating the signal received by the receiving antenna means and for converting the demodulated received signal into a received data signal having a unit corresponding to the signal width of one data bit, a control circuit for performing data processing on the basis of the received data signal converted by the receiver circuit, a transmitter circuit for forming a transmitted signal on the basis of a transmitted data signal supplied from the control circuit, and transmitting antenna means for transmitting the transmitted signal from the transmitter circuit to the reader/writer.

According to still another aspect of the present invention, there is provided an IC card reader/writer comprising receiving antenna means for receiving a signal transmitted from an IC card, a receiver circuit for demodulating the signal received by the receiving antenna means and for converting the demodulated received signal into a received data signal, a control circuit for data processing on the basis of the received data signal converted by the receiver circuit, a transmitter circuit or forming a transmitted signal on the basis of a transmitted data signal supplied from the control circuit and for setting the transmission width of the transmitted signal corresponding to one data bit to a value smaller than the signal width of one data bit, and transmitting antenna means for transmitting the transmitted signal from the transmitter circuit to the IC card.

According to a further aspect of the present invention, there is provided a non-contact IC card reader/writer comprising receiving antenna means for receiving a signal transmitted from an IC card, a receiver circuit for demodulating the signal received by the receiving antenna means and for converting the demodulated received signal into a received data signal having a unit corresponding to the signal width of one data bit, a control circuit for data processing on the basis of the received data signal converted by the receiver circuit, a transmitter circuit for forming a transmitted signal on the basis of a transmitted data signal supplied from the control circuit, and transmitting antenna means for transmitting the transmitted signal from the transmitter circuit to the IC card.

According to still a further aspect of the present invention, there is provided a data transmission method comprising the steps of transmitting a data row having a first data item as dummy data from a non-contact IC card to a reader/writer, controlling the amplification of a signal received by the reader/writer so that the intensity of the dummy data received from the IC card is equal to a predetermined value, and receiving the data row subsequent to the dummy data from the IC card.

DESCRIPTION OF THE PREFERRED EMBODIMENTS

Embodiments of the present invention will be described below with reference to the accompanying drawings.

Figure 1:
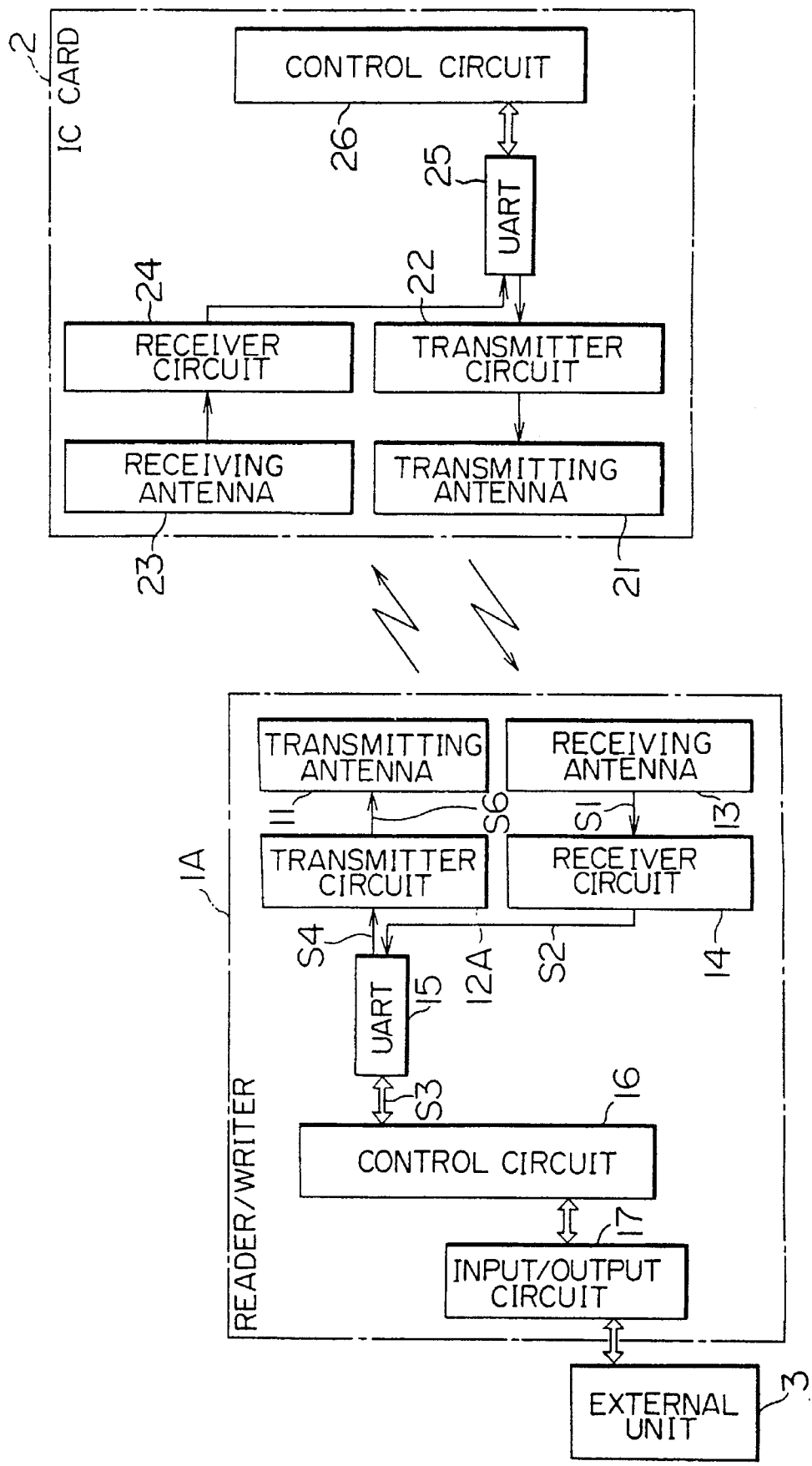
FIG. 1 is a block diagram of a data transmission system using a non-contact IC card reader/writer in accordance with an embodiment of the present invention.

Referring to FIG. 1, a non-contact reader/writer 1A is connected to an external unit 3, and a non-contact IC card 2 is positioned in the vicinity of the reader/writer 1A. The external unit 3 sends to the reader/writer 1A commands relating to signal transmission d receives results of communication with the IC card 2 and other signals. The reader/writer 1A has a transmitting antenna 11 for transmitting electromagnetic waves and a receiving antenna 13 for receiving electromagnetic waves. A transmitter circuit 12A is connected to the transmitting antenna 11 while a receiver circuit 14 is connected to the receiving antenna 13. A UART 15 is connected to the transmitter circuit 12A and the receiver circuit 14, and a control circuit 16 is connected to the UART 15. The control circuit 16 is connected to the external circuit 3 through an input/output circuit 17.

On the other hand, the IC card 2 has a transmitting antenna 21 and a receiving antenna 23 as in the case of the reader/writer 1A. A transmitter circuit 22 is connected to the transmitting antenna 21 while a receiver circuit 24 is connected to the receiving antenna 23. A UART 25 is connected to the transmitter circuit 22 and the receiver circuit 24, and a control circuit 26 is connected to the UART 25.

In each of the IC card 2 and the reader/writer 1A, receiving and transmitting can be performed with one antenna.

Figure 2:
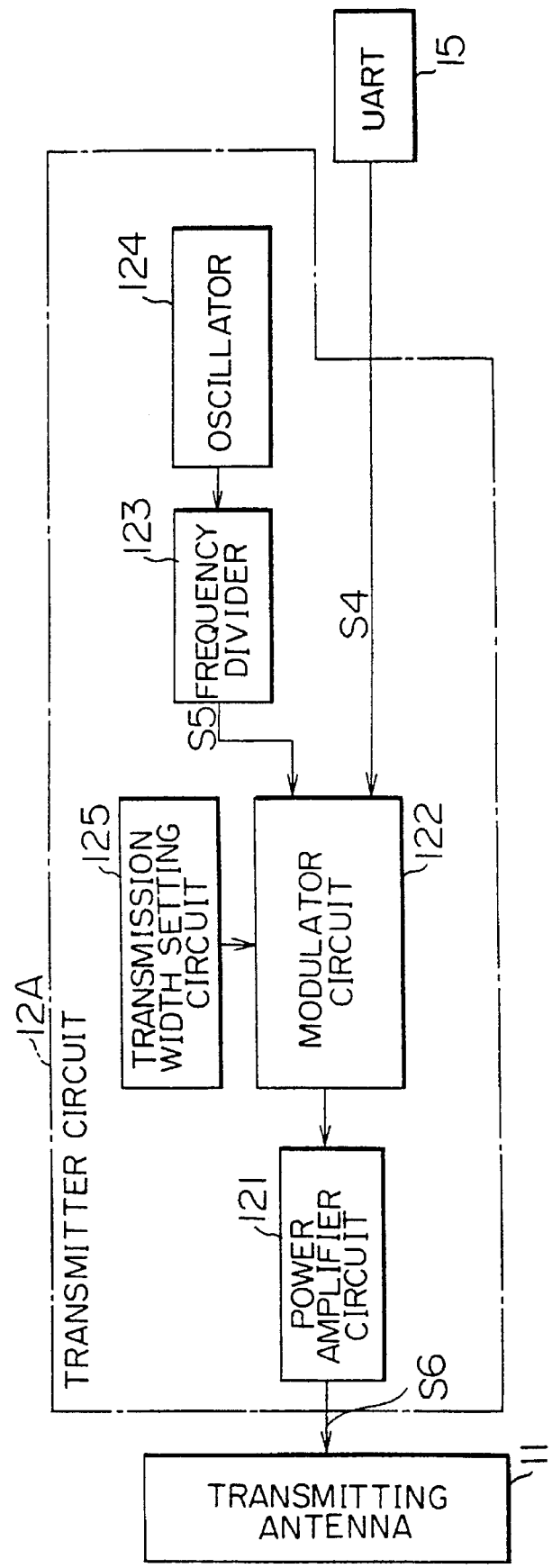
FIG. 2 is a block diagram of the internal arrangement of a transmitter circuit used in the reader/writer shown in FIG. 1.

FIG. 2 shows blocks of the transmitter circuit 12A. A frequency divider 123 is connected to an oscillator 124 which generates a clock signal. The frequency divider 123 serves to convert the clock signal generated by the oscillator 124 into a carrier clock signal having a carrier frequency. A multiplier may be used instead of the frequency divider 123 depending upon the relationship between the frequencies of the clock signal and the carrier. A modulator circuit 122 is connected to the frequency divider 123. A transmission width setting circuit 125 and a power amplifier circuit 121 are connected to the modulator circuit 122. The UART 15 is also connected to the modulator circuit 122. The transmission width setting circuit 125 sets a width of a modulated signal formed by the modulator circuit 122 to a desired value.

Figure 3:
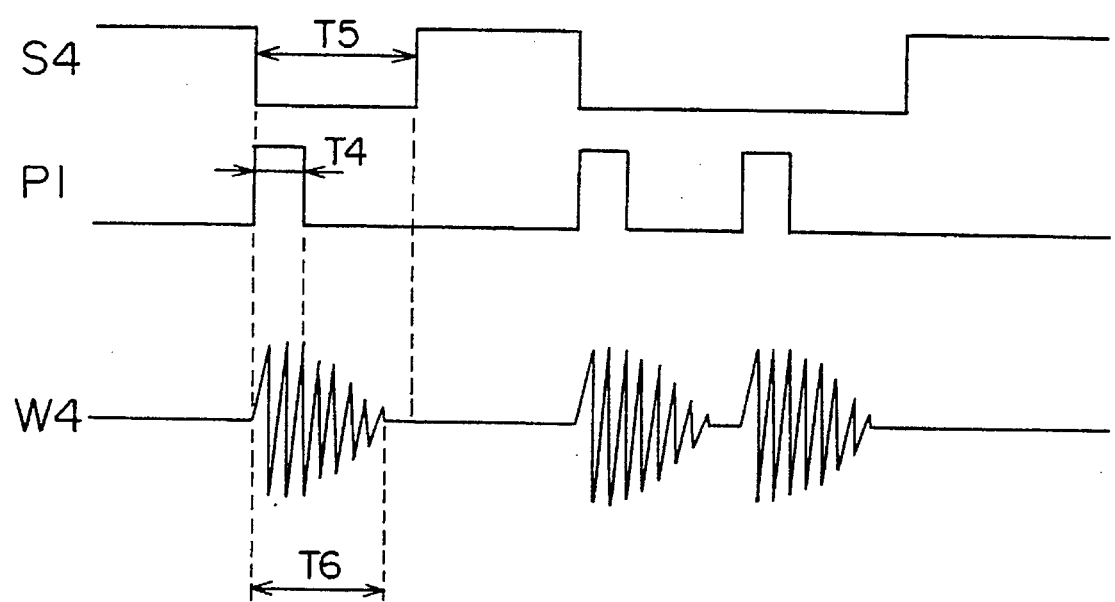
FIG. 3 is a timing chart of the operation of the transmitter circuit shown in FIG. 2.

The data transmitting operation this embodiment will be described below with reference to the timing chart of FIG. 3. First, parallel data S3 is sent to the UART 15 to be converted into serial data S4 which is sent to the transmitter circuit 12A. In the transmitter circuit 12A, the clock signal generated by the oscillator 124 is converted into carrier clock signal S5 which is supplied to the modulator circuit 122. In the modulator circuit 122, the clock signal is modulated with serial data S4 from the UART 15. At this time, the modulated signal has a length corresponding to a transmission width T4 determined by a pulse P1 as shown in FIG. 3. Transmission width T4 is smaller than a one-data-bit width T5. The modulated signal formed in this manner is amplified by the power amplifier circuit 121 and is sent to the transmitting antenna 11 as a transmitted signal S6, and transmitted waves W4 are sent out from the transmitting antenna 11.

Thus, width T6 of transmitted waves corresponding to one data bit can be smaller than one-data-bit width T5 even though electric waves actually transmitted have a waveform such as that of waveform W4 shown in FIG. 3, since ringing occurs subsequent to the transmission of electric waves through transmission width T4 from the transmitting antenna 11. Therefore, the IC card 2, receiving such electromagnetic waves W4, can accurately demodulate the data.

Transmission width T4 is selected by considering the following effects. That is, if width T4 is excessively small, the IC card 2, which receives transmitted electromagnetic waves W4 cannot detect the electromagnetic waves. If width T4 is is excessively large, width T6 of transmitted electromagnetic waves W4 exceeds one-data-bit width T5 when ringing occurs in the transmitting antenna 11, resulting in demodulation error in the IC card 2.

If the transmitting power of the reader/writer 1A is larger and if the receiving sensitivity of the reader/writer 1A is higher, the communication distance to the IC card 2 can be increased. However, if the IC card 2 is brought excessively close to the reader/writer 1A in a case where the reader/writer 1A has a large transmission power, ringing in the transmitting antenna 11 is increased so that a communication error occurs. When the reader/writer 1A receives electromagnetic waves, a communication error can also be caused by a signal in excess of the amplification range, if the IC card 2 is brought closer to the reader/writer 1A in a situation where the receiving sensitivity is excessively high. Accordingly, for stable communication from a short distance to a long distance, it is necessary to control the transmission power and the receiving sensitivity with respect to the communication distance.

Conventionally, the transmission power is controlled by changing the amplitude. For example, in a case where a communication error occurs when the IC card 2 is brought into a range of 10 cm to the reader/writer 1A in a system in which electromagnetic waves are normally transmitted from the reader/writer 1A at an amplitude of 50 V, the amplitude may be reduced to 20 V to enable communication at a distance not greater than 10 cm. However, if the amplitude is reduced, the communicatable distance is excessively short.

In contrast, in this embodiment, the transmission width is reduced while the amplitude is not changed, whereby ringing in the transmitting antenna 11 can be suppressed without a considerable reduction in the transmission power. Accordingly, stable communication can be achieved from a short distance to a long distance without changing the amplitude of electromagnetic waves with respect to the communication distance.

Figure 4:
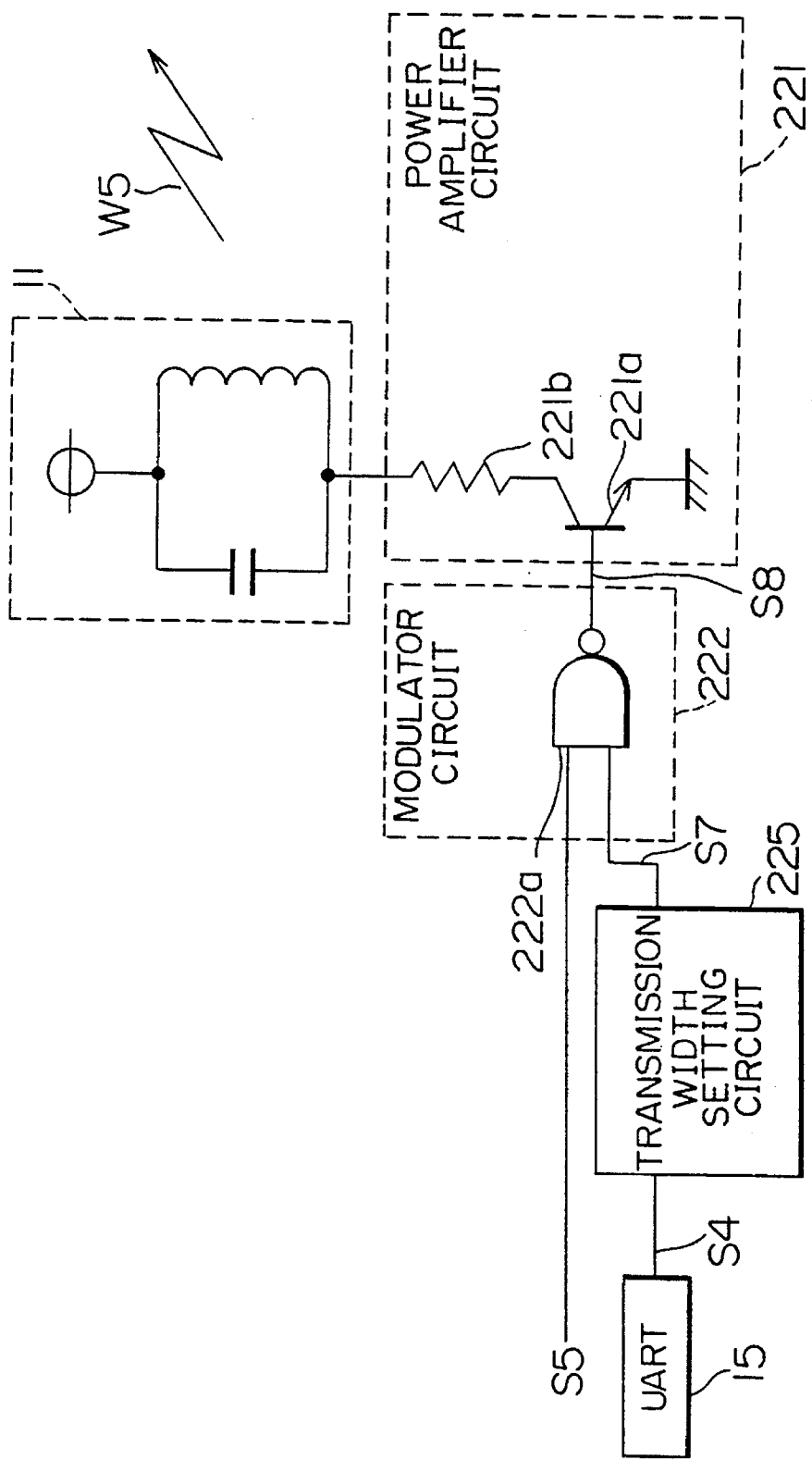
FIG. 4 is a block diagram of a portion of a transmitter circuit of a non-contact IC card reader/writer in accordance with a second embodiment of the present invention.

FIG. 4 shows a portion of a transmitter circuit of a non-contact IC card reader/writer in accordance with a second embodiment of the present invention. A modulator circuit 222 is connected to a UART 15 through a transmission width setting circuit 225, and a power amplifier circuit 221 is connected to the modulator circuit 222. The transmission width setting circuit 225 detects a falling edge of a signal of serial data S4 from the UART 15, generates a pulse signal S7 having a transmission width T7 smaller than one-data-bit width T5 using a timer or a monostable multivibrator and outputs the signal S7 to the modulator circuit 222. The modulator circuit 222 includes a NAND circuit 222a. The power amplifier circuit 221 has a transistor 221a on/off-driven by an output signal S8 from the modulator circuit 222, and a resistor 221b connected to the transistor 221a. The transistor 221a forms a ringing suppressor circuit.

Figure 5:
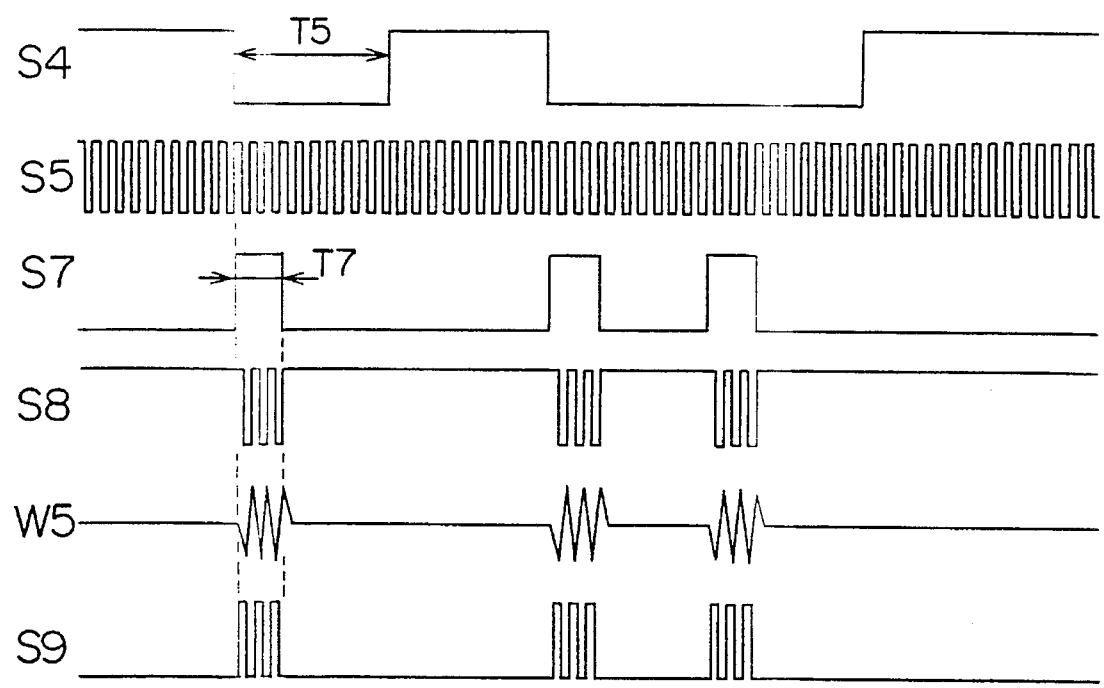
FIG. 5 is a timing chart of the operation of the transmitter circuit shown in FIG. 4.

The operation of this transmitter circuit will be described below with reference to the timing chart of FIG. 5. When serial data S4 is output from the UART 15 to the transmission width setting circuit 225, pulse signal S7 synchronized with the falling edge of the serial data S4 signal and a signal having transmission width T7 is output from the transmission width setting circuit 225 to the modulator circuit 222. In the modulator circuit 222, a NAND function using the pulse signal S7 and the carrier clock signal S5 is obtained to form a modulated signal S8. The transistor 221a of the power amplifier circuit 221 is on/off-driven on the basis of the modulated signal S8, and transmitted waves W5 are thereby sent out from the transmitting antenna 11.

When no electromagnetic waves are sent out from the transmitting antenna 11, that has a, when the pulse signal S7 is low level, the modulated signal S8 is high level and the transistor 221a is on. Accordingly, even though a current remains in the transmission antenna 11 after the pulse signal S7 has fallen from high level to low level, it flows to the ground through the resistor 221b and the transistor 221a, so that ringing is suppressed. Consequently, electromagnetic waves W5 can be sent out only through transmission width T7 set by the pulse signal S7, as shown in FIG. 5.

A method using an AND circuit instead of the NAND circuit 222a in the modulator circuit may be used as a method of obtaining a modulated signal. In such a case, a modulated signal S9 having a polarity opposite to that of the above-described modulated signal S8 is obtained, as shown in FIG. 5, and the transistor 221a is off when no electromagnetic waves are sent out from the transmitting antenna 11. If a current remains in the antenna 11, it cannot flow to the ground, resulting in ringing in the antenna 11.

The transmitter circuit shown in FIG. 2 or 4 can be incorporated in the IC card 2 as well as in the reader/writer 1A. By doing so, it is possible to reduce the influence of ringing in the transmitting antenna 21 of the IC card 2 at the time of transmission from the IC card 2 to the reader/writer 1A. This method, however, is not suitable for an IC card, which requires a low power consumption design. To achieve a suitable effect, it is necessary to use a complicated circuit arranged to suppress ringing by outputting electromagnetic waves having a phase reverse to that of the ringing signal.

Figure 6:
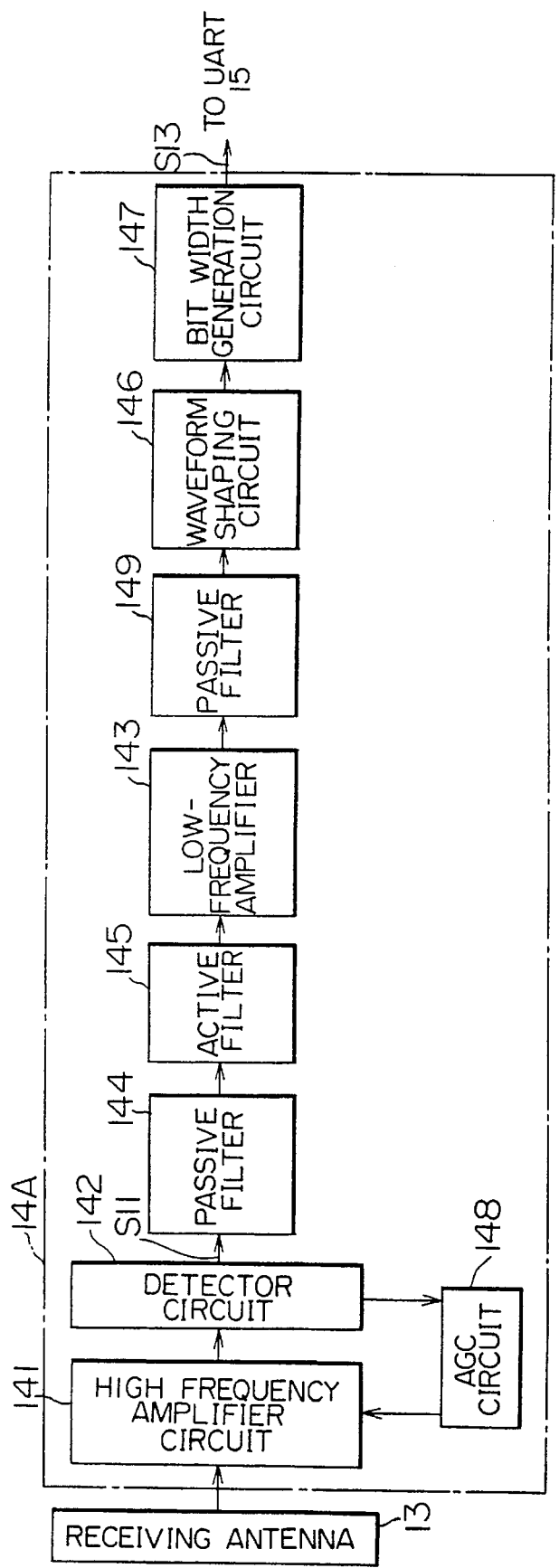
FIG. 6 is a block diagram of the internal arrangement of a receiver circuit of a non-contact IC card reader/writer in accordance with a third embodiment of the present invention.

A receiver circuit 14A, such as that shown in FIG. 6, may be used in place of the receiver circuit 14 of the reader/writer 1A. The receiver circuit 14A has a detector circuit 142 connected to the receiving antenna 13 through a high-frequency amplifier 141. A low-frequency amplifier circuit 143 is connected to the detector circuit 142 through a passive filter 144 for removing normal mode noise and an active filter 145 for removing common mode noise. A bit width generation circuit 147 is connected to the low-frequency amplifier circuit 143 through a passive filter 149 and a waveform shaping circuit 146 for converting an analog signal into a digital signal. The bit width generation circuit 147 converts a digital signal from the waveform shaping circuit 146 into a received data signal having a unit corresponding to the one-data-bit width and outputs the converted signal to the UART 15. An automatic gain control (AGC) circuit 148 for controlling the amplification factor of the high-frequency amplifier circuit 141 with respect to the input level of electromagnetic waves is connected to the detector circuit 142.

Figure 7:
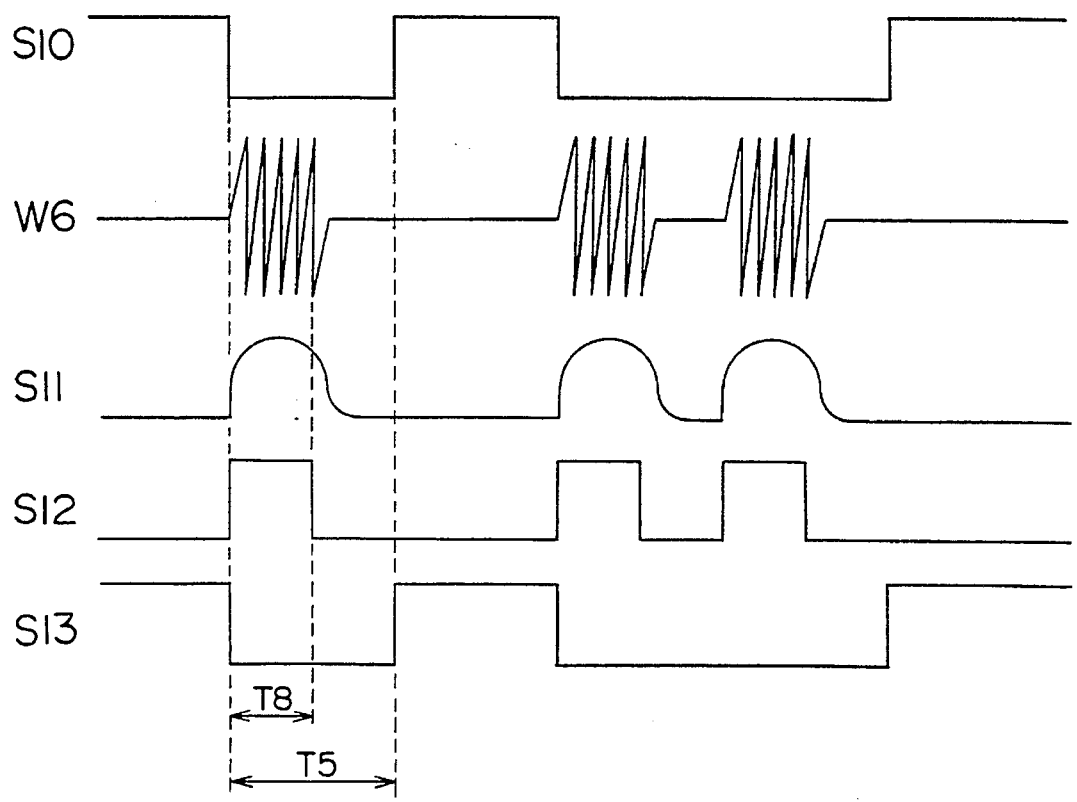
FIG. 7 is a timing chart of the operation of the receiver circuit shown in FIG. 6.

The operation of the receiver circuit 14A will be described below with reference to the timing chart of FIG. 7. Electromagnetic waves W6 are sent out from the IC card 2 on the basis of a data signal S10. The IC card 2 has a transmitter circuit such as that shown in FIG. 4 and sends out electromagnetic waves W6 of a transmission width T8 smaller than one-data-bit width T5. electromagnetic waves W6 are received by the receiving antenna 13 of the reader/writer, amplified by the high-frequency amplifier circuit 141 of the receiver circuit 14A, and demodulated by the detector circuit 142. A detection output S11 is thereby obtained. At this time, the amplification of the high-frequency amplifier circuit 141 is controlled by the AGC circuit 148 so that the intensity of the detection output S11 is constant irrespective of the input level of electromagnetic waves W6.

The detection output S11 is amplified by a low-frequency amplifier circuit 143 after noise has been removed therefrom by the passive filter 144 and the active filter 145. The low-frequency amplification may be performed simultaneously with filtering using an operational amplifier. It is thereby possible to form the low-frequency amplifier circuit 143, the passive filter 144 and the active filter 145 as one device. The signal amplified by the low-frequency amplifier 143 further undergoes filtering with the passive filter 149 and is thereafter converted into a digital signal S12 by the waveform shaping circuit 146. If a CMOS device is used for the waveform shaping circuit 146, it is necessary to amplify the signal to be input to the waveform shaping circuit 146 to half of the power supply voltage Vcc.

The output signal S12 from the waveform shaping circuit 146 is supplied to the bit width generation circuit 147 to be converted into a received data signal S13 having a unit corresponding to one-data-bit width T5. The bit width generation circuit 147 may be formed of a timer, a monostable multivibrator, or a shift register. The received data signal S13 formed in this manner is sent to the UART 15.

As described above, the bit width generation circuit 147 is provided in the receiver circuit 14A to enable the received signal to be accurately demodulated even when ringing occurs in the transmitting antenna 21 at the time of data transmission from the IC card 2.

If the IC card 2 is located close to the reader/writer 1A, the receiving antenna 11 of the reader/writer 1A directly receives strong electromagnetic waves from the IC card 2. In such a case, a problem relating to the control speed of the AGC circuit 148 in the receiver circuit 14A of the reader/writer 1A arises. That is, if the received electromagnetic waves are excessively strong, the time taken to control the amplification factor of the high-frequency amplifier circuit 141 is longer and there is therefore a possibility of failure to accurately demodulate the received signal from the initial data bit. The operating speed of the AGC circuit 148 may be increased. However, it is technically difficult to do so and to limit the price of the system.

Figure 8:
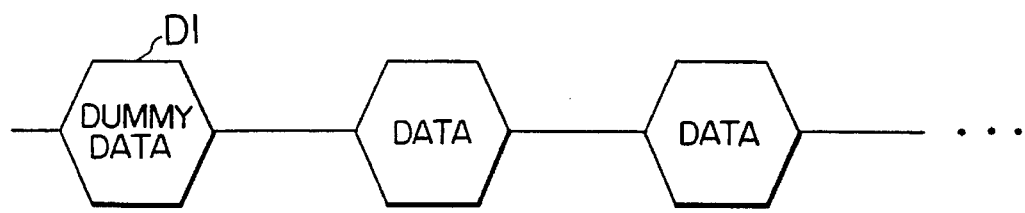
FIG. 8 is a diagram of the structure of transmitted data in a data transmission method in accordance with the present invention.

A method described below with reference to FIG. 8 may be adopted to ensure accurate data demodulation while a general use AGC circuit 148 is used. The IC card 2 transmits a first data item of a data row as dummy data D1 to the reader/writer 1A. The reader/writer 1A effects a rough gain control by using dummy data D1 received from the IC card 2. That is, the AGC circuit 148 of the receiver circuit 14A controls the amplification factor of the high-frequency amplifier circuit 141 so that the intensity of the first dummy data, i.e., the first item of the data row received from the IC card 2 is equal to a predetermined value. Thereafter, when each data item of the data row is received, the amplification factor of the high-frequency amplifier circuit 141 is finely adjusted by the AGC circuit 148. In this manner, data demodulation can be performed stably and accurately.

The receiver circuit shown in FIG. 6 can be incorporated in the IC card 2 as well as in the reader/writer 1A. By doing so, it is also possible to accurately demodulate data transmitted from the reader/writer 1A in the IC card 2.

Figure 9:
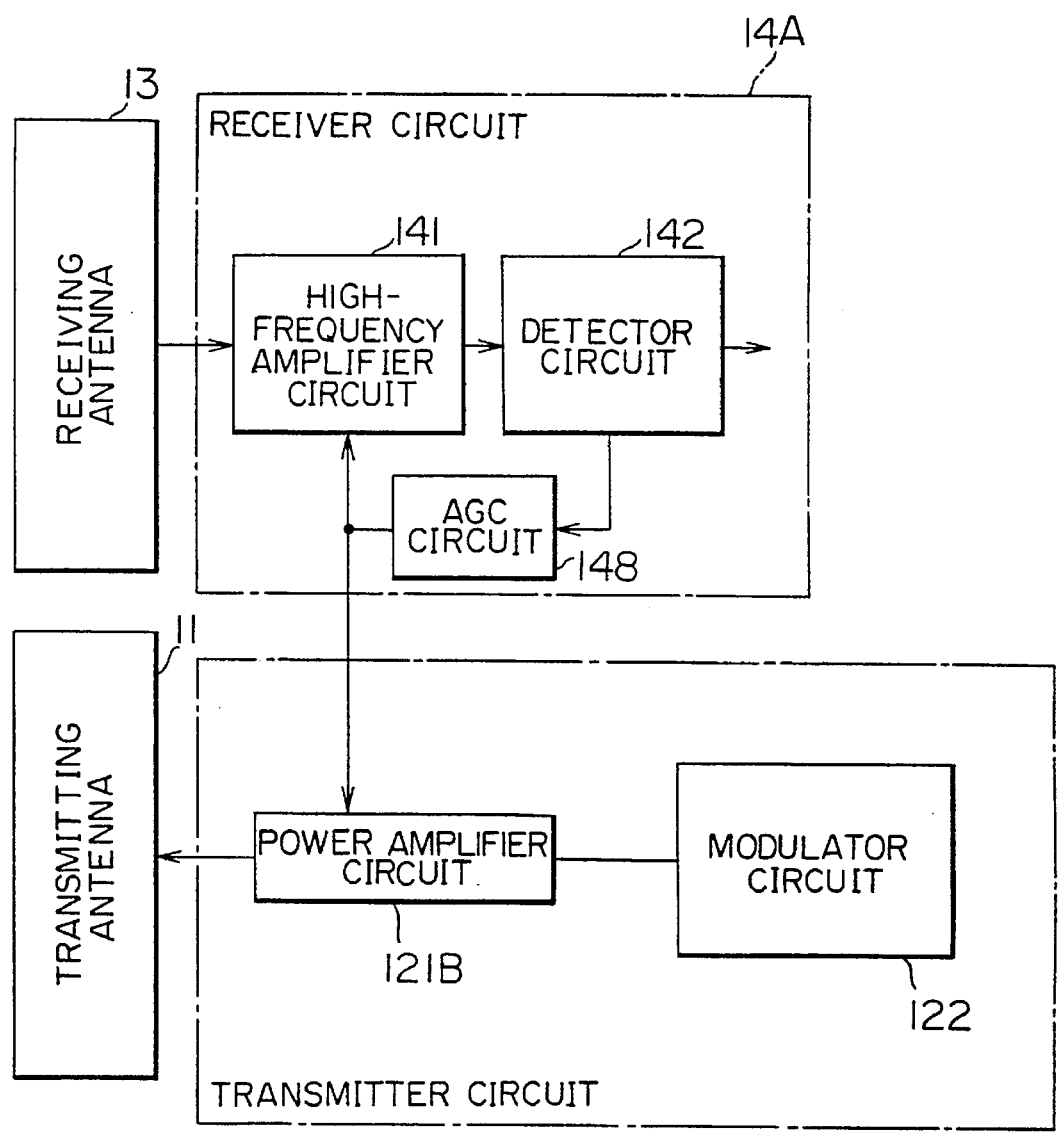
FIG. 9 is a block diagram of portions of a transmitter circuit and a receiver circuit of a non-contact IC card reader/writer in accordance with a fourth embodiment of the present invention.
Figure 10:
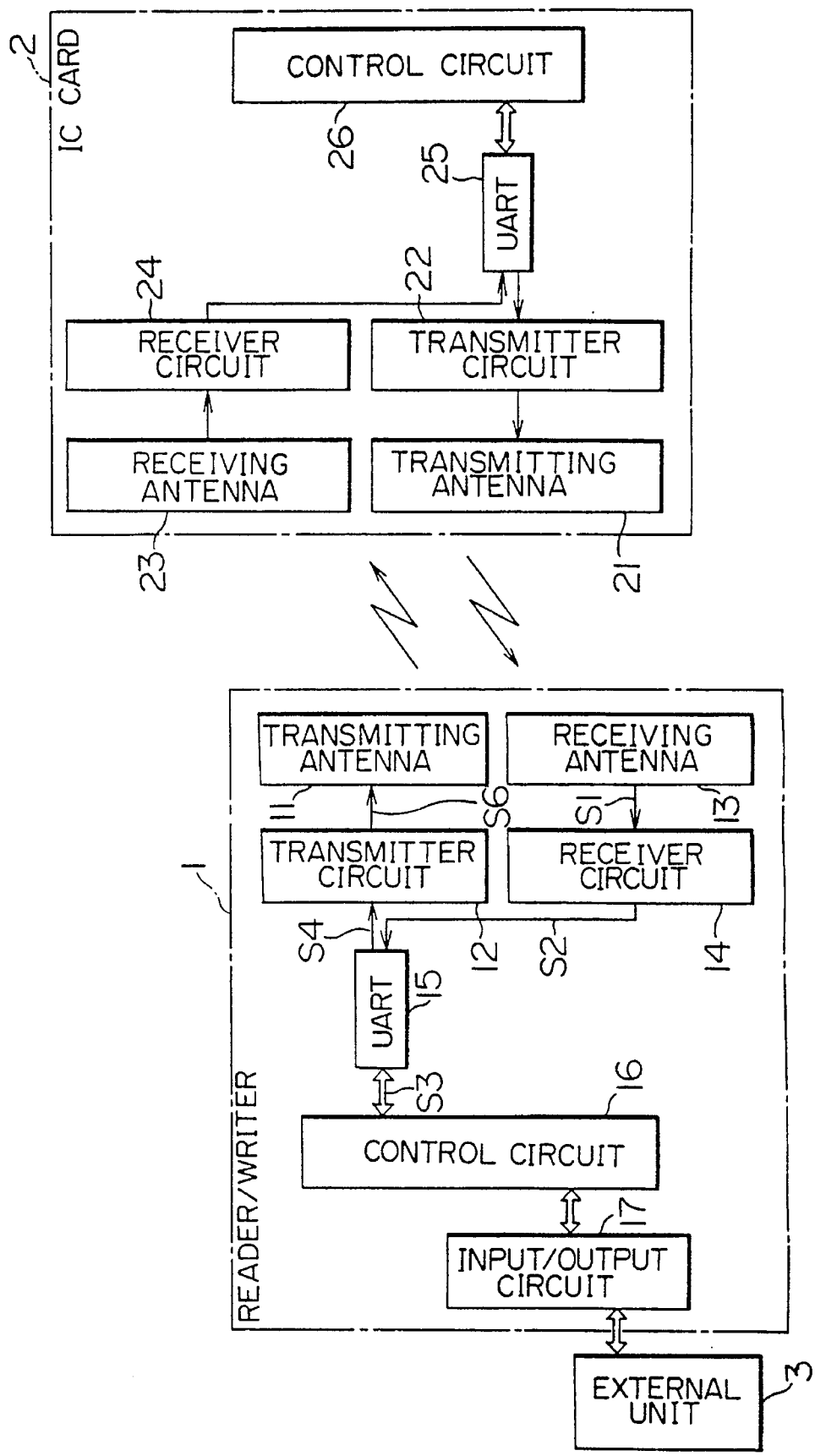
FIG. 10 is a block diagram of a conventional data transmission system using a non-contact IC card and a non-contact IC card reader/writer.
Figure 11:
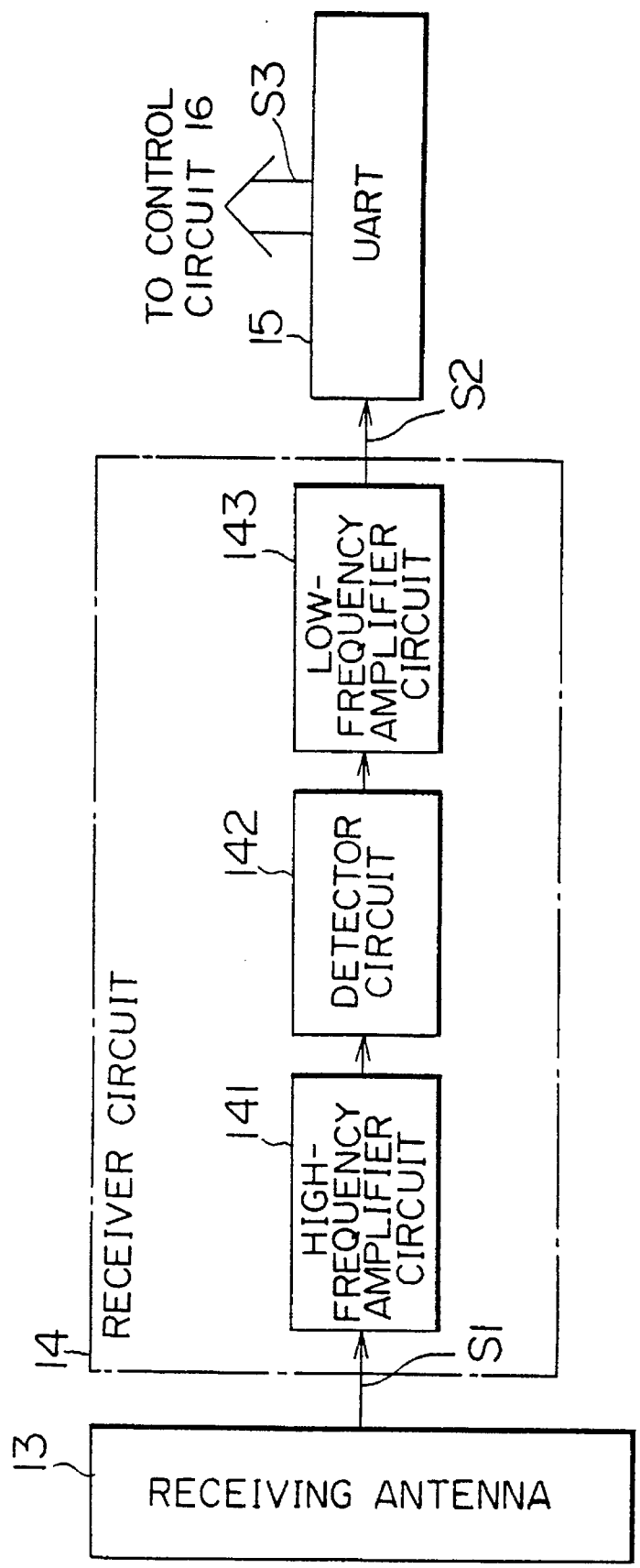
FIG. 11 is a block diagram of the internal arrangement of a receiver circuit used in the reader/writer shown in FIG. 10.
Figure 12:
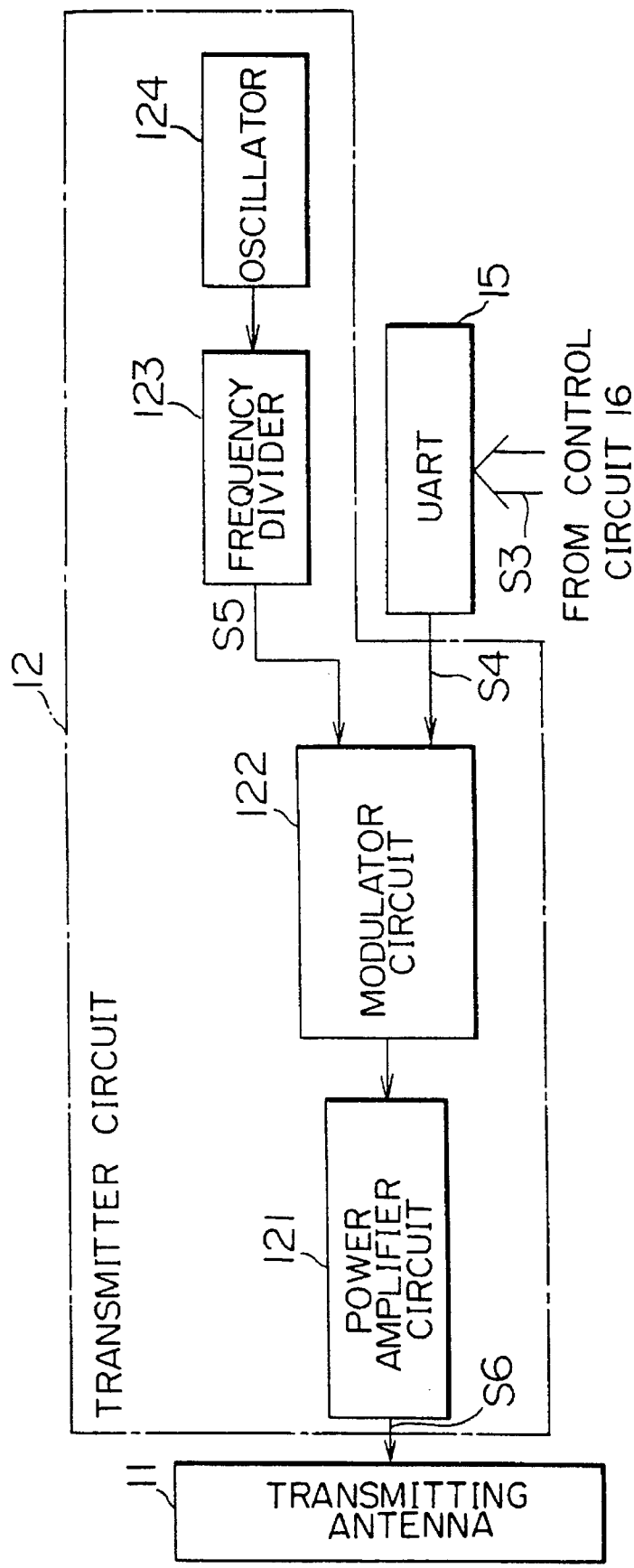
FIG. 12 is a block diagram of the internal arrangement of a transmitter circuit used in the reader/writer shown in FIG. 10.
Figure 13:
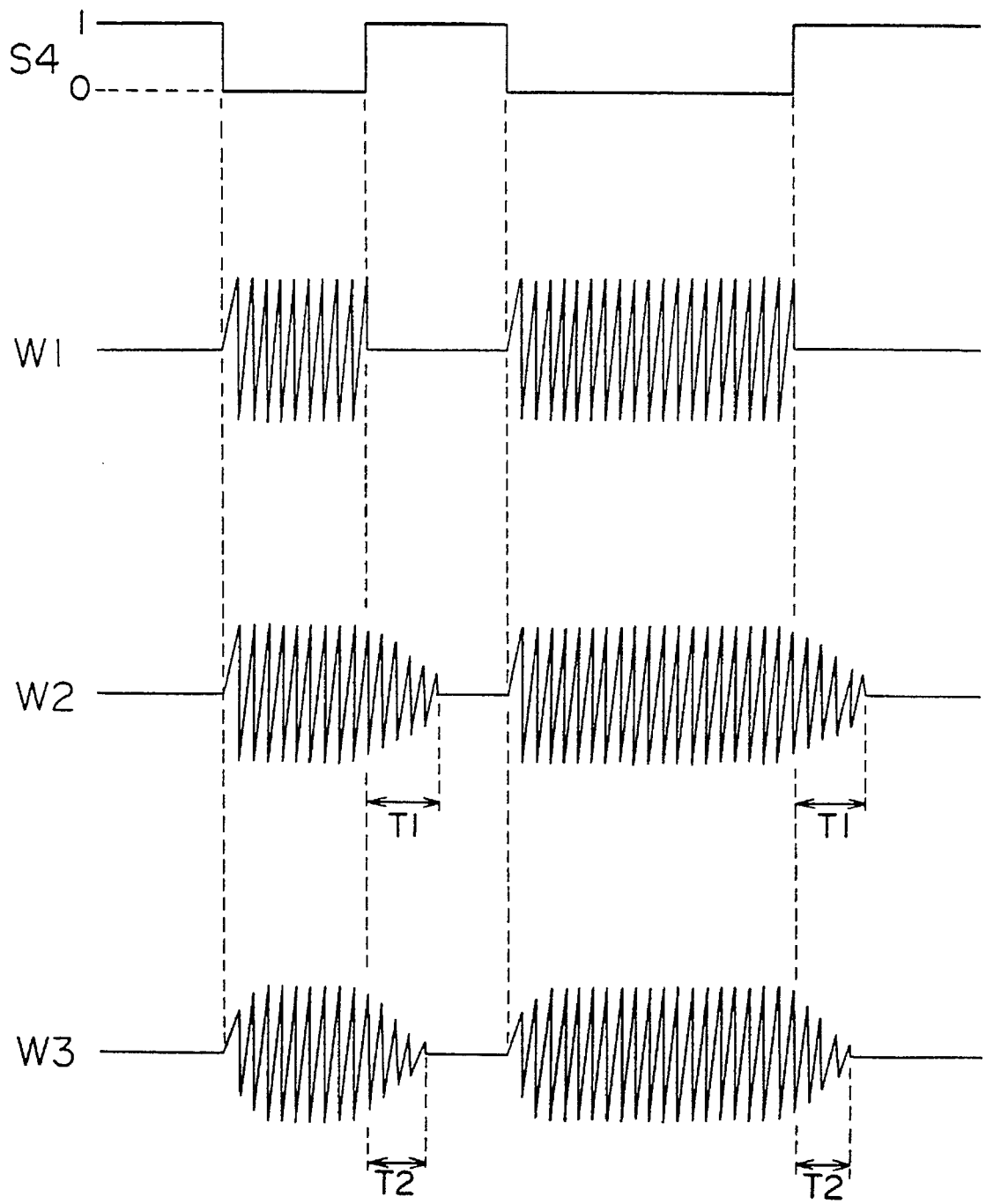
FIG. 13 is a waveform diagram showing a problem of the conventional art.

An arrangement such as that shown in FIG. 9 may also be adopted in which a receiver circuit 14A and a transmitter circuit 12B are provided in a reader/writer 1A, and the amplification factor of a power amplifier circuit 121B in the transmitter circuit 12B is controlled on the basis of an output from an AGC circuit 148 in the receiver circuit 14A. In this arrangement, the intensity of electromagnetic waves transmitted from the reader/writer 1A can be automatically controlled with respect to the distance to the IC card 2, and stable communication can be achieved no matter what the distance between the reader/writer 1A and the IC card 2.

The receiver circuit and the transmitter circuit shown in FIG. 9 may also be incorporated in the IC card to achieve the same effect.

What is claimed is:

1. A non-contact IC card comprising:
   receiving antenna means for receiving a signal transmitted from a reader/writer;
   a receiver circuit for demodulating the signal received by said receiving antenna means and for converting the demodulated signal into a received data signal having signal units with respective durations corresponding to a duration of one data bit, said receiver circuit comprising:
   a first amplifier circuit having a gain for amplifying the signal received by said receiving antenna means;
   a detector circuit for demodulating the received signal amplified by said first amplifier circuit;
   an automatic gain control circuit for controlling the gain of said first amplifier circuit upon reception of a signal received from an IC card, the signal received including a data row initially including dummy data, so that the intensity of the dummy data received from the IC card is equal to a predetermined intensity, whereby the received signal demodulated by said detector circuit has a constant intensity; and
   a bit width generation circuit for converting the received signal demodulated by said detector circuit into the received data signal having the signal units with respective durations corresponding to the duration of one data bit;
   a control circuit for data processing in response to the received data signal converted by said receiver circuit;
   a transmitter circuit for forming a transmission signal in response to a data signal supplied by said control circuit, said transmitting circuit comprising:
   a modulator circuit for forming the transmission signal in response to the data signal supplied by said control circuit; and a second amplifier circuit for amplifying the transmission signal from said modulator circuit and for outputting the amplified transmission signal to said transmitting antenna means, said automatic gain control circuit controlling the gain of said second amplifier circuit of said transmitter circuit; and transmitting antenna means for transmitting the transmission signal from said transmitter circuit to the reader/writer.

2. A non-contact IC card reader/writer comprising:

receiving antenna means for receiving a signal transmitted from an IC card;

a receiver circuit for demodulating the signal received by said receiving antenna means and for converting the demodulated received signal into a received data signal having signal units with respective durations corresponding to a duration of one data bit, said receiver circuit comprising:

a first amplifier circuit having a gain for amplifying the signal received by said receiving antenna means;

a detector circuit for demodulating the received signal amplified by said first amplifier circuit;

an automatic gain control circuit for controlling the gain of said first amplifier circuit upon reception of a signal received from an IC card, the signal received including a data row initially including dummy data, so that the intensity of the dummy received from the IC card is equal to a predetermined intensity, whereby the received signal demodulated by said detector circuit has a constant intensity; and a bit width generation circuit for converting the received signal demodulated by said detector circuit into the received data signal having the signal units with respective durations corresponding to the duration of one data bit;

a control circuit for data processing in response to the received data signal converted by said receiver circuit;

a transmitter circuit for forming a transmission signal in response to a data signal supplied by said control circuit; and transmitting antenna means for transmitting the transmission signal from said transmitter circuit to the IC card.

3. The reader/writer according to claim 2 wherein said transmitter circuit includes:

a modulator circuit for forming a transmission signal in response to the data signal supplied by said control circuit; and a second amplifier circuit for amplifying the transmission signal from said modulator circuit and for outputting the amplified transmission signal to said transmitting antenna means, said automatic gain control circuit controlling the gain of said second amplifier circuit of said transmitter circuit.

* * * * *

UNITED STATES PATENT AND TRADEMARK OFFICE
CERTIFICATE OF CORRECTION

PATENT NO.    :    5,619,529
DATED         :    April 8, 1997
INVENTOR(S)   :    Fujioka It is certified that error appears in the above-identified patent and that said Letters Patent is hereby corrected as shown below:

Column 9, Line 25, change "an" to --the--;

Line 27, after "dummy" insert --data--.

Signed and Sealed this

Fifth Day of August, 1997

Attest:

BRUCE LEHMAN

*Attesting Officer*     *Commissioner of Patents and Trademarks*